May 9, 1933.  L. P. KONGSTED  1,907,831
DYNAMOTOR
Filed Feb. 27, 1932
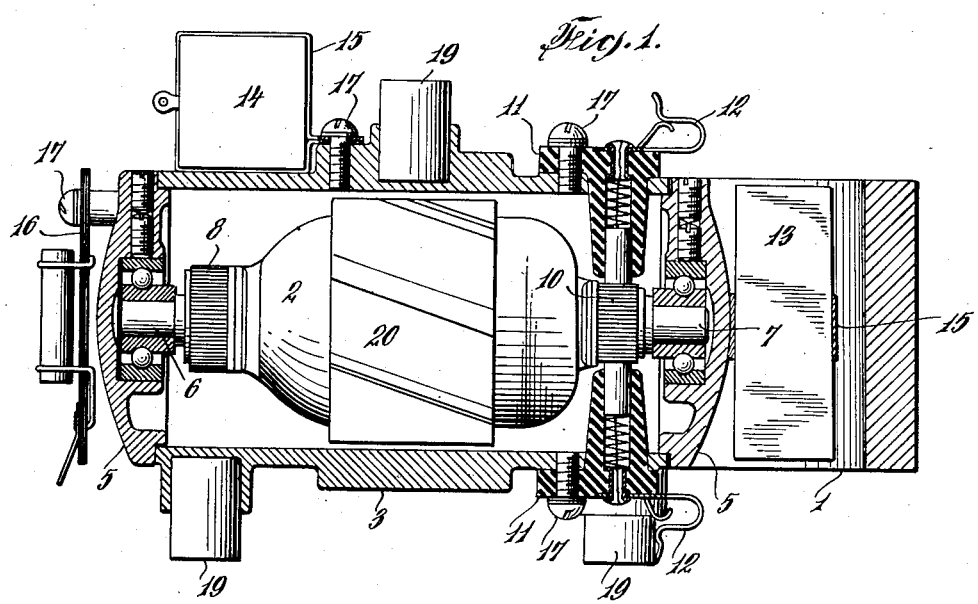
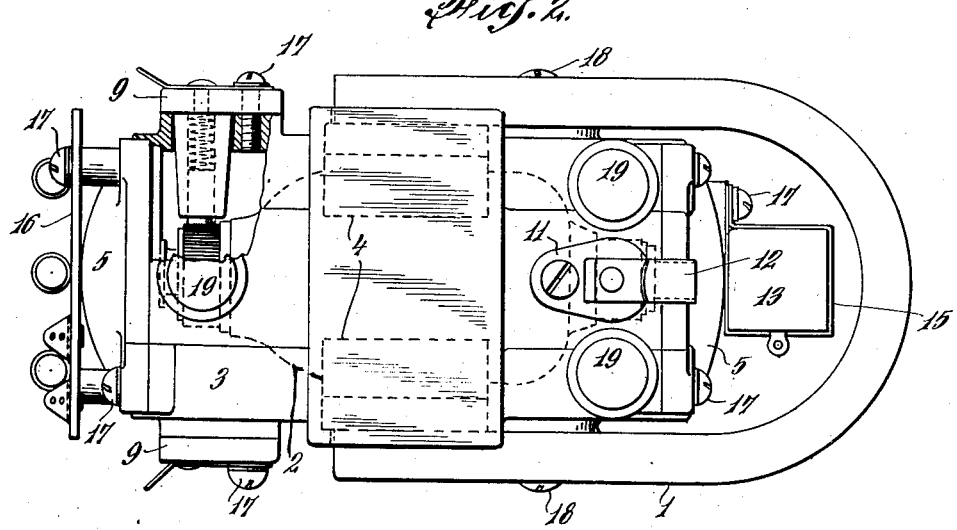
INVENTOR
Ludvig P. Kongsted
BY his ATTORNEY Patented May 9, 1933

1,907,831

UNITED STATES PATENT OFFICE

LUDVIG P. KONGSTED, OF LONGMEADOW, MASSACHUSETTS, ASSIGNOR TO UNITED AMERICAN BOSCH CORPORATION, OF SPRINGFIELD, MASSACHUSETTS, A CORPORATION OF NEW YORK

DYNAMOTOR

Application filed February 27, 1932. Serial No. 595,443.

This invention relates to improvements in electrical machines in the form of dynamotors or converters; which embody a convenient source of magnetic flux to supply the magnetic field and a suitable member cooperating therewith and bearing the operating and generating windings of the device.

An object of the invention is to provide a dynamotor of such a design that it will be very compact so that it occupies as little room as possible. In such form it can be mounted on automobiles, aircraft and other vehicles and apparatus which requires saving expense, space and weight in connection with the necessary parts and accessories.

A further object of the invention is to provide a dynamotor having a single frame on which the various fixed and movable elements are mounted so that the machine is rendered compact in size and shape and simple in construction; to enable a saving in size and weight to be effected and the expense of production to be reduced.

The nature and advantages of the invention are fully set forth in the following specification and novel features are pointed out in the appended claims. The disclosure, however, is explanatory only and I may vary the details actually shown herein, without departing from the scope and spirit of the invention as the same is defined broadly and specifically in the appended claims.

On the drawing which shows several forms of mechanism in which the invention is incorporated:

Fig. 1 is a vertical section through a dynamotor according to this invention; and Fig. 2 is a top plan of what appears in Fig. 1;

The same numerals identify the same parts throughout.

In the particular description of Figs. 1 and 2, I employ the numeral 1 to indicate one or more permanent magnets which are horseshoe in shape and adapted to be in stationary position, and 2 is the rotor which carries the windings of the machine. To mount the magnet 1 and rotor 2, I employ a framework in the form of a hollow casing or housing 3 with the rotor 2 disposed therein and the magnets 1 on the exterior thereof; the opposite sides of the housing 3 carrying polepieces 4 which the poles of the magnet 1 engage. The ends of the housing 3 may be open to receive closures 5 carrying anti-friction bearings which rotatably support journals or trunnions 6 and 7 at the opposite ends of the rotor 2. These bearings may be of any suitable type and are received in recesses on the inner faces of the closures 5.

At one end of the rotor 2 is a commutator 8 which cooperates with brushes in holders 9. The other end of the rotor has a similar commutator 10 engaged by brushes in insulated holders 11. The casing has openings in its sides from which the brush-holders project into the interior, these brush-holders being of any suitable construction; and the brush-holders 11 may have binding clips 12 electrically connected to the brushes and adapted to facilitate the fastening of the ends of conductors thereto.

In operation, current is supplied to the motor windings of the machine, for example, through the commutator 8, thus causing the rotor 2 to revolve. The generating windings on the rotor are connected to the segments of the commutator 10 and the current generated by the machine is let out by means of the conductors connected to the clips 12.

I may mount on the casing 3 condensers 13 and 14 held in place by straps 15. The strap for the condenser 13 is secured to the closure 5 within the bend of the magnet 1 and the strap for the condenser 14 is affixed to the side of the housing. The opposite housing 5 may bear on its exterior an insulating plate or panel carrying suitable resistors. The numeral 17 indicates screws or the like fastening devices by which the brush-holders 9 and 11 and the straps 15 and panel 16 are secured in place. At 18 are similar screws to attach the magnet 1 firmly to the housing 3. On the outside of the housing 3 are sockets or hollow bosses in which are inserted plugs 19 to facilitate mounting the dynamotor in any suitable position. Both condensers 13 and 14 and the resistors carried by the panel 16 are used in the secondary or output circuit.

The dynamotor can be driven by an ordinary lighting or starting battery on an automobile or similar vehicle, and designed to furnish either direct or alternating current, to energize a radio set or for any other required purpose. The dynamotor is thus exceedingly easy to build, comprises but few parts, is entirely supported by the framework or housing 3 and will operate at high efficiency in practice.

The windings of the rotor 2 may be of any suitable type and need not be further described. The rotor may be encircled by a suitable band 20 carrying transverse ribs or projections which will act as a fan and prevent over heating of the machine.

Of course suitable terminals for connection to the supply circuit are provided on the brush-holders 9.

Having described my invention, what I claim as new and desire to secure and protect by Letters Patent in the United States is:

1. A dynamotor comprising a framework in the form of a closed housing, a rotor in said framework, closures for the ends of the framework supporting anti-friction bearings for the rotor, the rotor carrying a pair of commutators, brush-holders in the framework carrying brushes to engage said commutators, a magnet on said framework and polepieces in the sides of the framework in contact with the ends of the magnet, the limbs of said magnet extending in the same direction as said rotor.

2. A dynamotor comprising a hollow framework with detachable end closures, anti-friction bearings carried by said closures, a rotor in the framework having its ends mounted in said bearings, commutators on the rotor, brush-holders carried by the framework with brushes cooperating with said commutators, a magnet with its limbs in line with the framework and secured thereto, and polepieces carried by the sides of the framework and connected to the ends of the magnet.

3. A dynamotor comprising a hollow framework with detachable end closures, anti-friction bearings carried by said closures, a rotor in the framework having its ends mounted in said bearings, commutators on the rotor, brush-holders carried by the framework with brushes cooperating with said commutators, a magnet with its limbs in line with the framework and secured thereto, the limbs of the magnet extending in the same direction as the rotor, and polepieces carried by the sides of the framework and connected to the ends of the magnet.

4. A dynamotor comprising a framework, a rotor in said framework, a magnet carried by said framework and having its polepieces in proximity to said rotor, commutators carried by the rotor, plates at the ends of the framework adjacent the ends of the rotor, the magnet extending in the same direction as the rotor, anti-friction bearings for the ends of the rotor, and contact brushes supported adjacent the plates for engaging the commutators.

5. A dynamotor comprising a hollow framework with detachable end closures, bearings carried by said closures, a rotor in the framework mounted in said bearings, a magnet with its limbs in line with the framework and extending in the same direction as the rotor, the framework having polepieces on the opposite faces engaged by the magnet, said framework also having external bosses on at least one of the remaining faces, and mounting plugs disposed in said bosses.

6. A dynamotor comprising a hollow framework with detachable end closures, bearings carried by said closures, a rotor in the framework mounted in said bearings, commutators on the rotor, brush holders on the framework with brushes cooperating with said commutators, a magnet with its limbs in line with the framework and secured thereto, the said limbs extending in the same direction as said rotor, polepieces carried by opposite sides of the framework and engaged by the magnet, at least one of the remaining faces of said framework between said polepieces having recessed bosses, and mounting plugs in said bosses.

In testimony whereof I affix my signature

LUDVIG P. KONGSTED.